Nov. 12, 1940.    P. H. BRACE ET AL    2,221,570
ELECTROMAGNETIC TESTING SYSTEM
Filed Nov. 3, 1938    5 Sheets-Sheet 2

Fig. 2

WITNESSES:

INVENTORS
Porter H. Brace &
Clifton S. Williams
BY
Paul E. Friedemann
ATTORNEY Nov. 12, 1940.  P. H. BRACE ET AL  2,221,570

ELECTROMAGNETIC TESTING SYSTEM

Filed Nov. 3, 1938  5 Sheets-Sheet 4

INVENTORS
Porter H. Brace &
Clifton S. Williams
BY
Paul E. Friedeman
ATTORNEY

INVENTORS
Porter H. Brace &
Clifton S. Williams
BY
ATTORNEY

Patented Nov. 12, 1940

2,221,570

UNITED STATES PATENT OFFICE 2,221,570

ELECTROMAGNETIC TESTING SYSTEM

Porter H. Brace and Clifton S. Williams, Forest Hills, Pa., assignors to Westinghouse Electric & Manufacturing Company, East Pittsburgh, Pa., a corporation of Pennsylvania Application November 3, 1938, Serial No. 238,600

13 Claims. (Cl. 175—183)

Our invention relates to electromagnetic testing and more particularly to methods and means for testing magnetic metals as iron, steel and magnetic alloys for defects in their structure.

In the manufacture of steel parts, as well as other paramagnetic metal parts, there is frequent need for a rapid, and sensitive method for detecting flaws. Flaws may consist of cracks, non-metallic inclusions and agrregations, irregularity of size and inhomogeneity due to local variations in the composition, constitution or structure of the metal, its mechanical history, thermal history or combinations of one or more of these.

Various methods have heretofore been developed and have been practiced for detecting flaws. For example, small magnets have been used in prior art methods and devices to explore the magnetic fields in suspected regions; suspension of magnetic particles in liquids have met with some success and magnetic powders are often used for detecting cracks and other abrupt discontinuities.

There are certain types of flaws, however, that are detected only with difficulty and sometimes not at all by the methods and apparatus heretofore known. A case in point is that of "grinding burns" sometimes produced on the surface of articles shaped by grinding. A grinding burn is the result of a local overheating caused by the improper application of a grinding wheel.

The material affected by a grinding burn may be of very slight depth. Nevertheless, when for example, a cone of a roller bearing passes into service with such a defect, early failure occurs which failure sometimes has disastrous consequences. Grinding burns may be slight or severe, but are always a serious defect. These grinding burns cannot be detected by the usual methods, and expensive mechanical methods such as "lapping" are employed as a means for detecting these defects in finished articles which to all outward appearances are perfect.

One broad object of our invention is to electromagnetically inspect the surface of a test piece.

A more specific object of our invention is to demagnetize a test piece, subject the test piece to a given magnetomotive force to thus magnetize the test piece in a given manner, and then scan the test piece to determine whether or not all the surface portions subjected to the given magnetomotive force are uniformly magnetized.

A further object of our invention is to determine whether or not a test piece has uniform magnetizing properties over a given portion of its surface.

Another object of our invention is to magnetically condition a test piece so that it should normally, if of uniform magnetic properties throughout, have a uniform magnetization over any selected surface area and to scan the selected surface to determine whether or not the test piece has any surface regions that did not respond in the expected manner to said conditioning operation.

It is also an object of our invention to magnetically condition a test piece so that it should normally, if of uniform magnetic properties throughout, have a uniform magnetization over any selected surface area and to scan any selected point or all the points within the selected surface area to determine whether or not the test piece has any surface region that did not respond in the expected manner to the said conditioning operation and to determine the position on the test piece of the region where any non-uniformity is noted.

It is also an object of our invention to provide a simple and sensitive accurate electromagnetic testing system whereby test pieces can be rapidly and cheaply tested.

The objects hereinbefore expressly stated are merely examples of the many objects and advantages of our invention and the others not hereinbefore stated will become more apparent from a study of the following specification when considered in conjunction with the accompanying drawings, in which:

Figure 1:
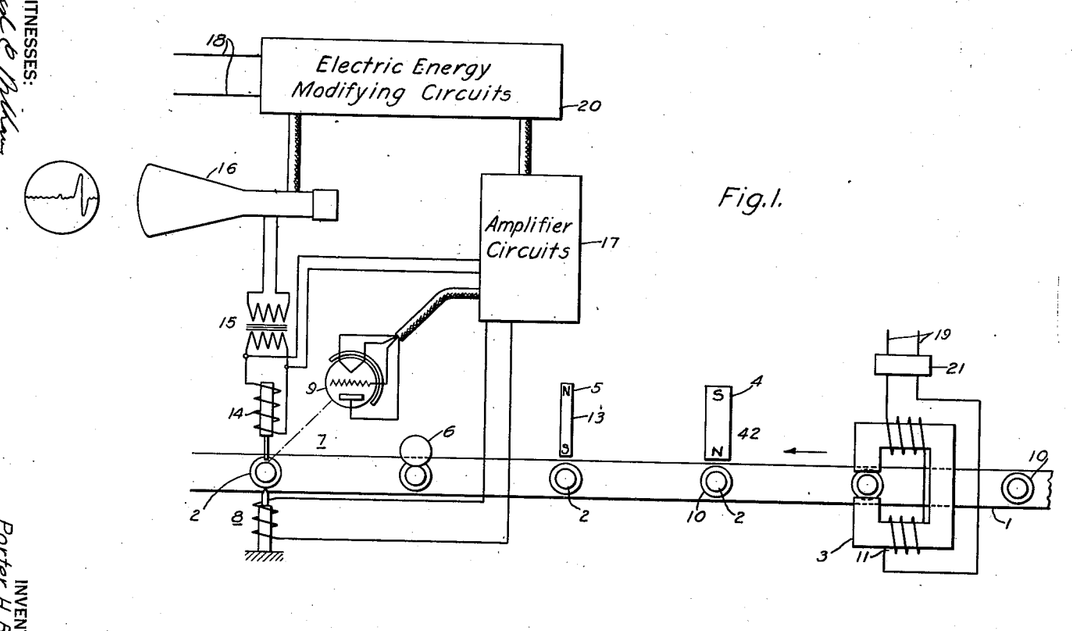
Figure 1 shows our invention diagrammatically in its simplest aspects.

In Fig. 1, 1 designates a conveyor, operated in any suitable manner, for conveying the test pieces 2 from right to left to: the demagnetizing unit 3, the magnetizing unit 4 for magnetizing the test pieces to have a given polarity, the magnetizing unit 5 for partially neutralizing the test piece, the marker roll 6, and detector 7, the final marker 8, and the stroboscopic light 9.

A test piece when subjected to a grinding operation may have been heated to such an extent that a given region, which may be small, has passed the "critical point" for the steel, or other metal, concerned and upon cooling the metal has developed the hard "martensitic" structure characteristic of quench hardened but untempered steel. The entire depth of the disturbed region may be very slight—of the order of 0.001 inch for example, but still an unfailing source of trouble in service. Obviously, such a slight defect is difficult of detection; however, our apparatus and method of procedure will detect these defects with such speed, ease, certainty and low cost that our invention constitutes an important advance in the art.

When a test piece arrives for test, its previous magnetic history almost without exception makes it unfit for magnetic testing, because the presence of a flaw, with our apparatus and method of operation, is detected by variations of the external field of the piece being tested. Such being the case, it is desirable to demagnetize it before testing. This may be done by any one of several methods. The demagnetizing may be done by placing the test piece in a strong alternating magnetic field, the strength of which is gradually reduced to zero, meanwhile rotating the test piece to make sure that all parts receive the same treatment.

In the showing of Fig. 1, the attendant places the test pieces on rotable chucks 10 disposed on the conveyor 1, and as the test pieces move in the direction indicated by the arrow adjacent the conveyor and rotate about their respective axes, they pass through the alternating magnetic field produced by the demagnetizer 3.

The demagnetizing effect is at first weak, then becomes strong and then as the test piece moves out of the active zone of the demagnetizer, the alternating magnetic field, as affecting the test piece, becomes zero. The same effect may, of course, be accomplished by subjecting the coils 11 of the demagnetizer to a high voltage and then reducing the voltage gradually to zero while the test piece rotates in the effective zone of the demagnetizer.

This demagnetization may be done as a separate operation or after mounting the test piece for test, the important thing being to subject it to a cyclic magnetization with a maximum intensity approaching saturation and gradually decreasing to a negligible value in order to wipe out the effects of any previous magnetization.

Since our method depends on variations of the external field, of a piece being tested, it is necessary, after the demagnetizing operation, to remagnetize the test piece in a given manner. To this end, we provide a permanent magnet so mounted that it sweeps the surface to be investigated, while the test piece is being rotated, whereby the surface is magnetized to a certain degree.

For some types of test pieces and for some uses, the simple remagnetization just discussed may suffice, but we have found that greater sensitivity can be obtained by bringing the magnet, as 12, up to the test piece with, say, a north pole adjacent and then removing it and then cautiously bringing the south pole adjacent, but not as near, to the test piece.

The same results may, of course, be obtained by two permanent magnets as 12 and 13 shown, where 12 is a strong permanent magnet having a north pole adjacent the test piece, and where 13 is a weaker permanent magnet having its south pole adjacent the test piece.

The same results may also be obtained by two electromagnets of different polarities adjacent the test piece and different strengths, or by one electromagnet whose strength and polarity is altered while the test piece is in its field.

This greater accuracy and sensitivity obtained by the remagnetization just explained is apparently due to the fact that the residual magnetic induction of the test piece material may be fairly uniform while there may be certain regions, such as very light "burns," where the coercive force has been noticeably altered.

In such a case, the external field first produced in the test piece, by, say, the magnet 12, may be quite uniform. However, when a reversed magnetization is applied, the general field is destroyed or at least very much reduced, leaving that field due to altered regions standing in relief. Similarly, magnetically "soft" spots are revealed by a reversal of the test remagnetization because local demagnetization would occur before the general field has been greatly reduced.

The test pieces 2 after leaving the magnet 13 are ready for the detector 7, but since it is often desirable not only to know if a test piece is defective but also to know where the defect may be found on the test piece, we provide a marker roll 6 for placing indicia, as numbers, on the test piece.

The electromagnetic coil 14 of the detector is connected through a transformer 15, whose function is to step up the voltage delivered by the coil 14 to a point suitable for operating the cathode ray oscilloscope 16. The output circuit of transformer 15 is connected to a pair of deflecting plates of the cathode ray oscilloscope.

A cathode ray oscilloscope is a well known piece of electrical apparatus; however, if there be any doubt as to its structure and function, reference may be had to the Swedlund Patents Nos. 2,088,495 and 2,078,644, issued July 27, 1937 and April 27, 1937, respectively, relating to such cathode ray oscilloscopes.

The impulse of the coil 14 is connected to amplifier circuits 17 which effect the illumination of the test piece by the stroboscopic light 9 each time a defect is observed by the detector 7. Since the test piece has indicia, as numbers, marked thereon, the numbers opposite the detector only, when a defect is observed, will be visible, and the attendant is thus apprised of the position of the defect on the test piece.

Similarly, the marker 8 may be caused to place a mark as a punch mark on the test piece each time a defect is observed by the detector. Since the angular disposition of the marker 8 to the detector is known, the position of the defect on the test piece will also be known.

The electrical units are supplied with suitable electric energy from source 18 and 19 through electric energy modifying means 20 and 21, respectively.

The showing in Fig. 1 is schematic and thus does not show an actual machine. For a showing a structure such as may be used in an actual machine, reference should be had to Figs. 2 to 7, inclusive.

Figure 2:
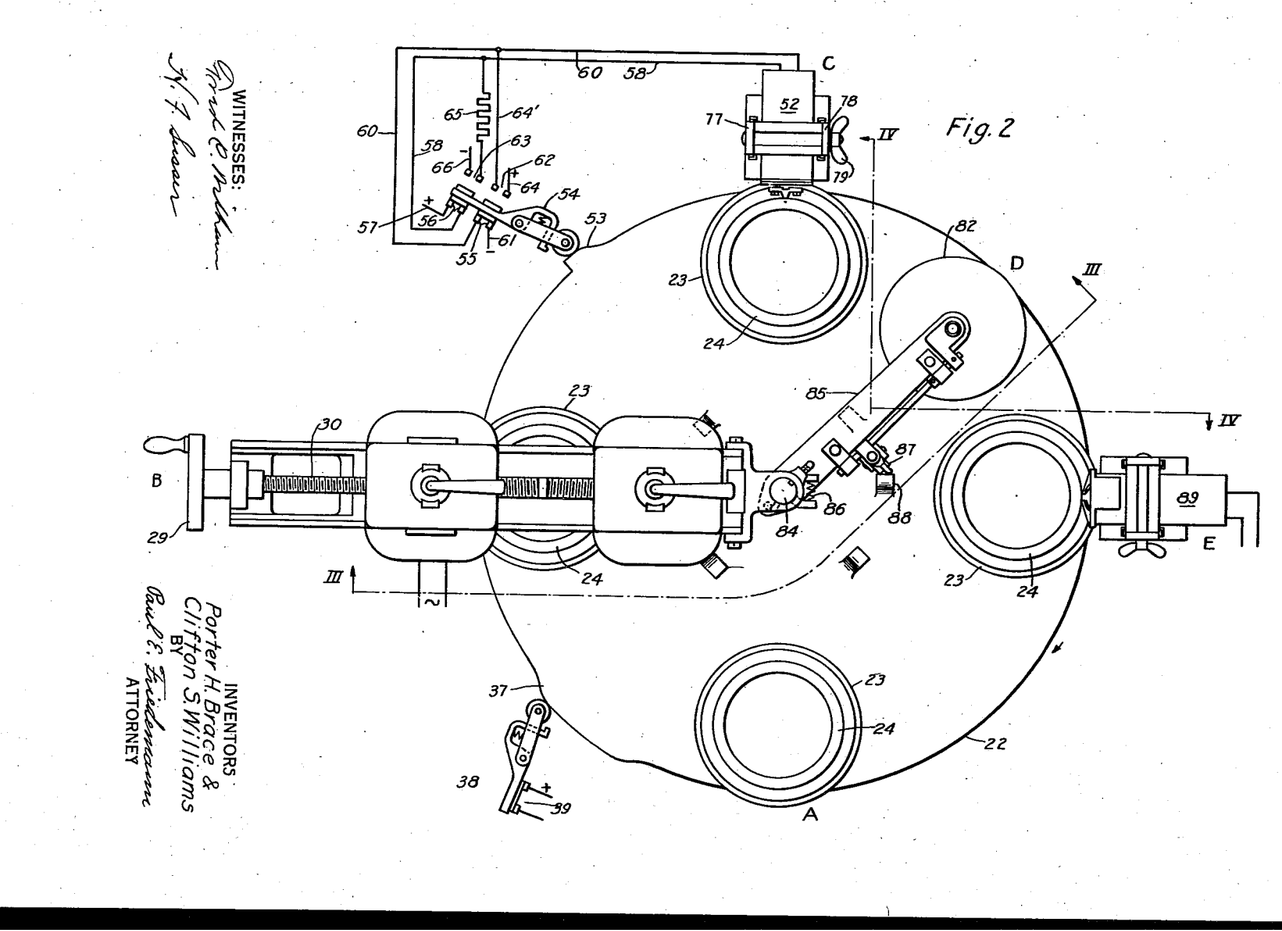
Fig. 2 is a plan view of a machine as it may actually be constructed by means of which we practice our invention.
Figure 3:
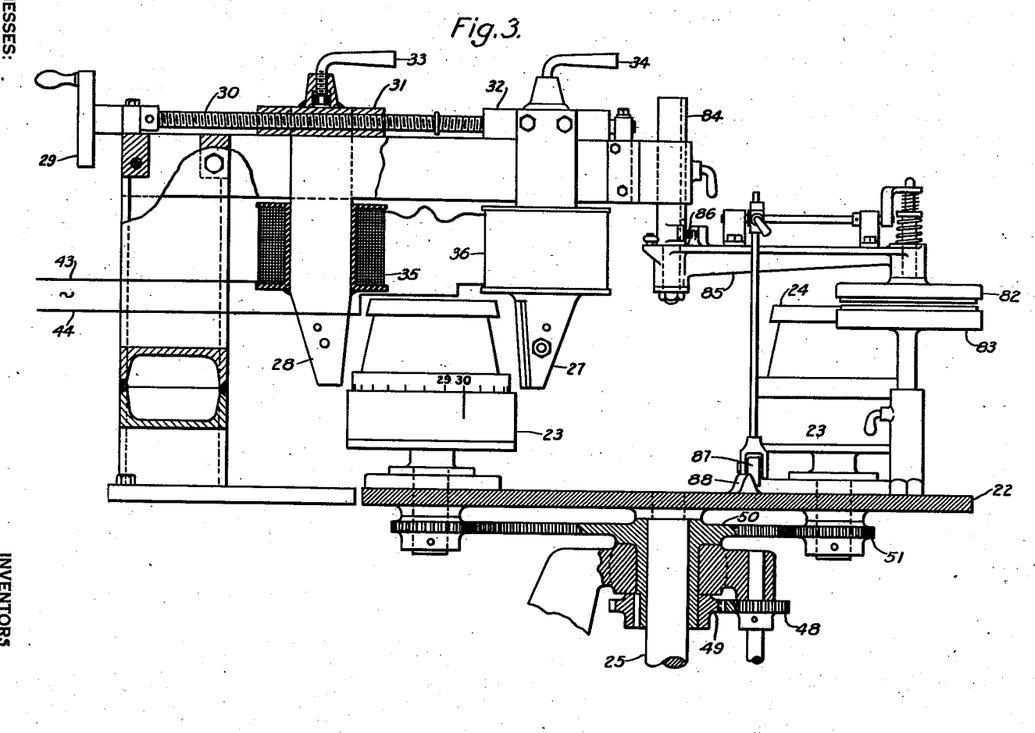
Fig. 3 is a side view of our invention with parts in section substantially on the line III—III of Fig. 2.

In Fig. 2, 22 shows a plan view of a rotating table provided with four independently rotating chucks, or clutches, 23 for receiving the test pieces 24. The position A is the loading or test piece positioning and test piece removing station. If the method is to be such that the oscilloscope indicates directly the position of the defect on the test piece, then the attendant places the test piece in the chuck so that the circumferential indicia, as numbers one to thirty, have a given relation to an index on the chuck. The index is shown in Fig. 3 by an arrow on the chuck and the test piece so placed in the chuck that the zero position, which also corresponds to the last or thirtieth position when thirty graduations are used, lines up with the arrow.

Positions B, C, D, and E correspond to the demagnetizing position, the remagnetizing position, the marking or printing position, and the detecting position.

The table 22 is coupled through a shaft 25 to a motor 25' (see Fig. 8) which motor may be a constant speed motor, as a synchronous motor, or a variable speed motor. The operating characteristics of the table are such that the test piece is halted at positions A, B, C, and E just long enough that the attendant has time to remove the inspected test piece at position A, do such sorting or discarding as the test results indicate as being necessary, and properly replace a new test piece.

The system of control for causing the intermittent rotation of the table in a clockwise direction constitutes no part of our present invention. Furthermore, it goes without saying that the mechanical arrangement between motor 26 (see Fig. 9) and the chucks 23 will be such as to cause a stopping of the rotation of the chuck in position A.

Our system of testing is so rapid and accurate that it is only limited by the speed with which the attendant can remove a test piece, sort it, and position a second test piece in the chuck. A good operator may test as many as twenty pieces a minute.

The chuck is arranged to receive test pieces of different sizes, and a mere inspection of Fig. 3 shows that pole pieces 27 and 28 may be moved toward and away from each other by merely manipulating handwheel 29 for operating the reversely threaded stem 30. When an adjustment is to be made, the locking sleeves 31 and 32 are released by proper manipulation of setting bolts 33 and 34 and handwheel 29 is operated until the poles 27 and 28 are in proper position with reference to the test piece. Thereafter sleeves 31 and 32 are locked in position by bolts 33 and 34.

The demagnetizing coils 35 and 36 are arranged to be first energized with an alternating current of high voltage which is gradually decreased to zero. As table 22 rotates clockwise, the cam 37 operates the switch to close the circuit at contact members 39 for the windings of an electromagnetic clutch 40. (See Fig. 8.) The motor 25' thus operates the rheostat arm 41 in a clockwise direction establishing a circuit for windings, or coils, 35 and 36.

Figure 8:
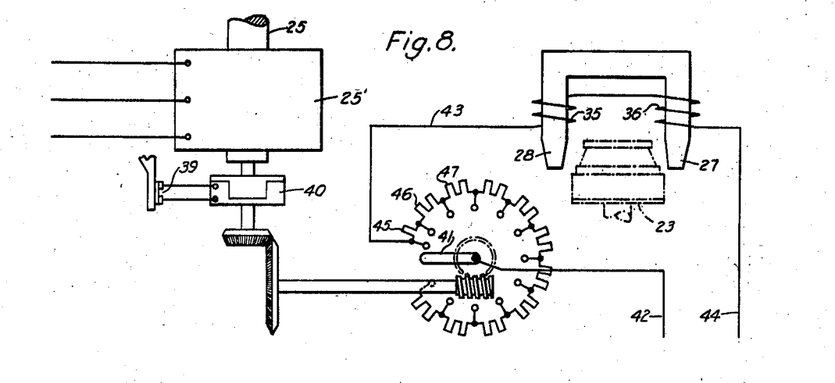
Fig. 8 shows the circuits to be used with the demagnetizing unit, which unit is shown more in detail in Fig. 3.

The circuit may be traced from line 42 through arm 41 first through conductor 43, coils 35 and 36 back to line 44. The contact members 38 close just when a test piece passes in the active zone of poles 27 and 28. Since the arm 41 is driven by motor 25' the voltage decreases from a given high value to zero, as more and more resistor sections as 45, 46, 47, etc., are included in the circuit of coils 35 and 36 until opening of the circuit for coils 35 and 36, takes place in synchronism with the movement of the test piece. The test piece is thus subjected at first to a large demagnetizing effect, which effect gradually decreases to zero just as the test piece also passes out of the zone of poles 27 and 28.

While the test piece is being demagnetized, the motor 26 rotates the test piece on its own axis to thus subject it to the same effect over all its surface. The rotation is relatively rapid and may be arranged to be in absolute synchronism with the sweep of the oscilloscope the purpose of which synchronous rotation will appear later. The rotation of the test piece is effected through gears 48, 49, 50 and 51.

Continued rotation brings the rotating test piece in the zone of the remagnetizing unit 52. As the test piece enters the zone of unit 52, cam 53 operates switch 54 to close contact members 55 and 56. A circuit is thus established from positive conductor 57 through contact members 56, conductor 58, magnetizing coils 59 (Fig. 5), conductor 60, and contact members 55 to the negative conductor 61. The coil 59 is so energized that the magnetic pole adjacent the test piece is a north pole of a given strength.

As the table 22 moves a trifle farther, switch 54 is released and as a consequence contact members 62 and 63 are closed. A circuit is thus established from positive conductor 64 through contact members 62, conductors 64' and 60 through coil 59 in reverse direction, conductor 58, resistor 65, and contact members 63 to the negative conductor 66. Resistor 65 is of such a resistance value so as to make the effect of coil 59 less than for the first circuit established for this coil and since the coil 59 is energized in reverse direction, a south pole of lesser strength than the preceding north pole will be disposed adjacent the test piece.

Figure 4:
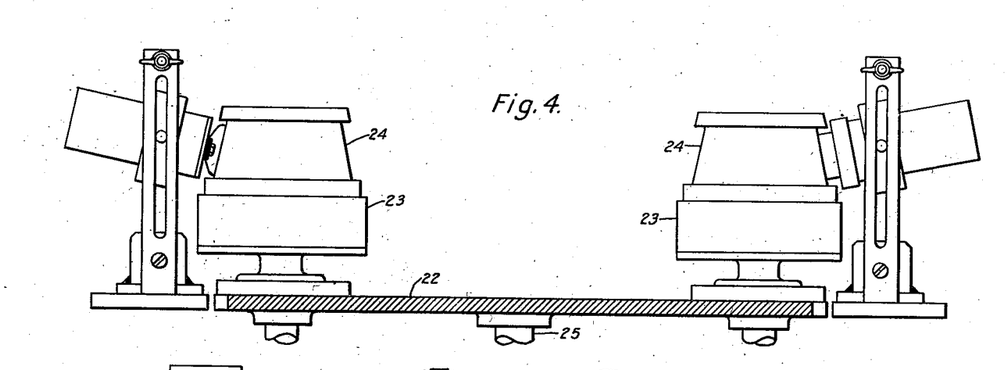
Fig. 4 is a distorted sectional view on line IV—IV of Fig. 2 showing the relation of the magnetizing unit and the detecting unit to the test piece and without showing the marking mechanism.
Figures 5, 6, 7:
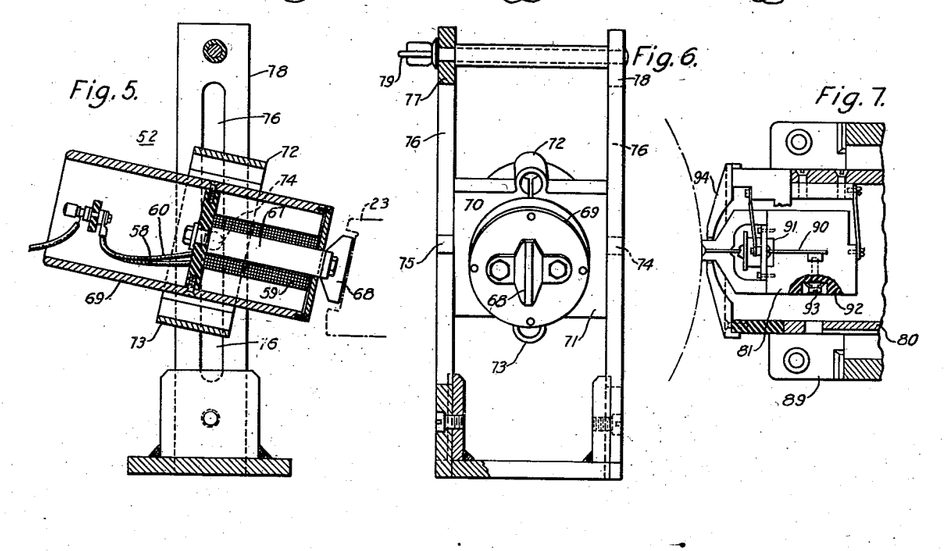
Fig. 5 is a vertical sectional view of the magnetizing unit.
Fig. 6 is a view of the magnetizing unit as viewed from the side directed to the test piece.
Fig. 7 is a horizontal sectional view of the magnetic pick-up unit.

The remagnetizing unit is shown more in detail in Figs. 4, 5 and 6. This unit 52 comprises a soft iron core 67 having a nose piece 68. The core and nose piece are mounted in a cylindrical shell 69 of non-magnetic material. The shell 69 fits snugly into a pair of resiliently interconnected clamping jaws 70 and 71. These jaws have the resilient interconnections 72 and 73 which normally, when the jaws are not actuated toward the shell 69, permit free longitudinal movement of the shell toward or away from the test piece.

The jaws have a pair of trunnions 74 and 75 that fit into slots 76 in the vertical standards 77 and 78. The trunnions permit vertical and angular movement of the shell. Since the jaws 70 and 71 permit longitudinal movement of the shell 69, a universal adjustment in a given plane may be given to the magnetizing unit, that is nose piece 68 may be positioned as near as desirable to the surface of the test piece, then by merely tightening wing-nut 79, the nose piece is held in proper position.

The shell 80 for the magnetic detector unit 81 and all the supporting units therefore are the same in structure, dimensions, and function to the corresponding units for the remagnetizing units and any further discussion thereof need not be made.

If stroboscopic means, as shown in Fig. 1, are used and the test pieces are not furnished to the testing apparatus with markings, then it is desirable to mark the test pieces.

The marking apparatus comprises a stamp pad 82 (Fig. 3) which receives its marking material, as ink, from the supply 83. The marking mechanisms are mounted on an adjustable stationary shaft 84 to which the arm 85 is pivoted. The arm 85 is biased to a given position on the shaft by a spring 86. The arrangement is such that pad 82 can move over a small arc with the table 22.

As the roller 87 is actuated by dog 88 on table 22, the pad 82 is resiliently pressed against supply pad 83 and, since the arm 85 has a limited angular movement, the movement of pad 83, which is mounted on the table 22, does not interfere with the inking operation.

Continued movement of the table, thereafter, moves the test piece up to the electromagnetic detecting unit 89 (Fig. 7). This detecting element of detecting unit comprises a blade type core 90 of high permeability, low hysteresis material such as the 50-50 nickel-iron alloy Hypernik surrounded by a pick-up coil 91 of a few hundred turns of fine insulated copper wire. The blade type core 90 is clamped in the supporting block 92 by the lock nut 93. The supporting block 92, the protecting nose pieces 94, the shell 80 and the rest of the supporting structure surrounding the pick-up coil are all made of non-magnetic material so as not to affect the operation of the pick-up coil.

Figures 9, 10, 11, 12, 13:
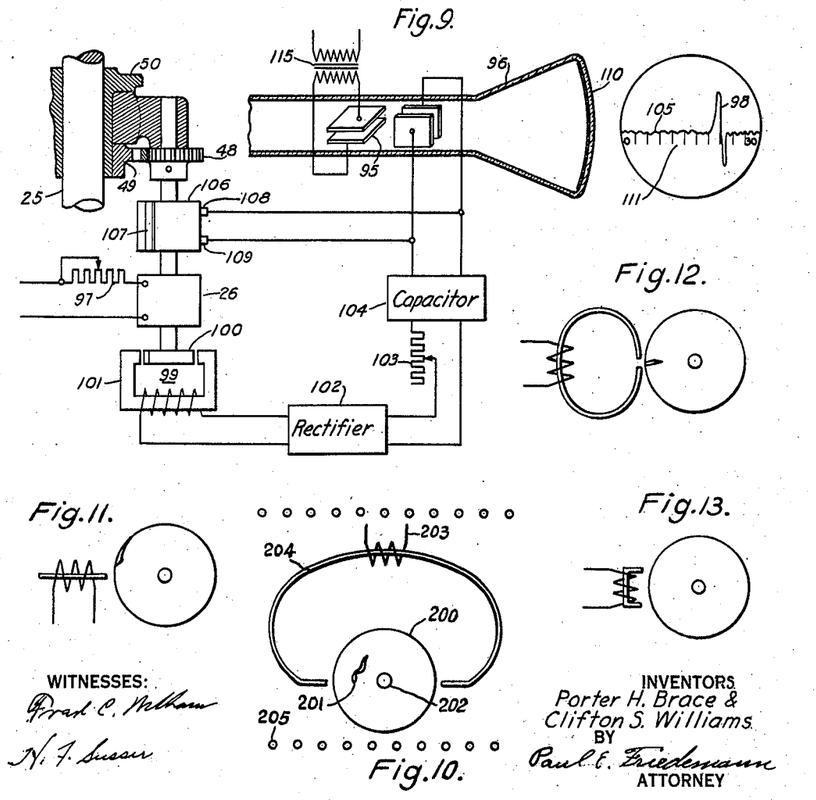
Fig. 9 shows a modification of our invention.
Fig. 10 shows a type of detector we may use when locating deep-seated defects.
Figs. 11, 12 and 13 show the various forms a detector may take.

The pick-up coil is connected to one pair of the deflecting plates 95 of a cathode-ray oscilloscope 96, usually through a transformer as 15, shown in Fig. 1, or 115, shown in Fig. 9. The function of the transformer is to step up the voltage delivered by the pick-up coil to a value suitable for operating the oscilloscope.

The detector is arranged with the end of its bladelike core 90 close to the surface of the rotating test piece. In the test piece is magnetically homogeneous any magnetization acquired at the remagnetizing unit 52 will be uniform and no continually recurring response will be obtained from the oscilloscope; however, if there is a defect in the test piece, the response of the oscilloscope will indicate it by a "kick" in the trace of the "sweep."

In other words, irregularities of the magnetic properties of the material, the presence of mechanical defects or non-metallic inclusions, etc., will be reflected as irregularities of the external field which vary the flux linking the detector coil 91 and are thus registered on the oscilloscope as a curve whose ordinates are proportional to the time rate of change of the flux linking the detector coil.

The impulse of the coil 91 may be used, not only to operate the oscilloscope, but to operate a stroboscopic light or a marking device or both, as shown in Fig. 1.

If the motor 26, operating the test pieces, is in its operation synchronized by suitably varying its speed as by means of an adjustable resistor 97, then the position of the "kick" 98 with reference to the entire curve will indicate the position of the defect on the test piece.

To avoid the need of the synchronization mentioned in the preceding paragraph and to secure the advantage of a variable speed for the operation of our system, we provide the modification shown in Fig. 9.

In Fig. 9, we show an alternating current generator 99 having a permanent magnet 100 coupled to the shaft of the motor 26 and disposed to rotate in a uniform field of the magnet poles 101. This generator has its current rectified through rectifier 102 and its current is delivered through adjustable resistor 103, to a capacitor 104.

Transformer 115 is interposed between the detector coil and plates 95 to increase the potential delivered to the deflecting plates 95. An amplifier, not shown, may be used to further increase the deflecting voltage which serves to produce the vertical component of the movement of the oscilloscope beam as it traces its curve as represented at 105.

A cylindrical member 106 of insulating material is also mounted to rotate with the shaft of motor 26. This member carries a metal sector 107 which serves to momentarily short-circuit the brushes 108 and 109. The sector 107 or several sectors depending on the gear ratio used between motor 26 and chuck 23, are so spaced that the test piece makes one revolution for each short-circuiting of the brushes 108 and 109.

To facilitate observation, the test piece is provided with indicia corresponding in number and character to the indicia on the face of the oscilloscope screen 110 as, for instance, from zero to thirty. Further, by placing the indicia on the test piece in correct position on the chuck, that is, to correspond to the arrow shown and by positioning the arrow so that sector 107 effects its short-circuiting operation when both the sector and the arrow hold a given position in space, the position of the defect on the test piece can be directly read from the scale 111, regardless of speed variations of the entire system.

This is accomplished as follows: The generator 99 creates an electromotive force which gradually charges the capacitor 104 and in response to this rising voltage, or charge, the oscilloscope beam moves in a transverse direction until the brushes 108 and 109 are short-circuited by the sector 107. Thus the sweep of the oscilloscope beam is timed and phased with reference to the rotation of the test piece.

As the speed of rotation varies so does the voltage of the generator 99. Thus the shortening time of charging the capacitor 104 is compensated by increased charging voltage and the amplitude of the sweep of the oscilloscope beam made more nearly independent of speed of rotation than if a steady voltage were applied to the charging circuit.

When it is desired to gain information about the soundness of material at points at some distance below the surface modified detectors may be used.

Fig. 10 is a schematic diagram showing a bar of metal, 200, containing a defective region, 201, the former being arranged for rotation about its longitudinal axis 202. Two detector coils, or one, as 203, linked by a yoke, 204, of magnetic material are provided to detect variance of the field surrounding 200 after it has been magnetized by passing current through the coil 205.

Fig. 11 shows a blade-like detector such as is shown more in detail in Figs. 2, 4 and 7.

Fig. 12 shows a type of detector of use for detecting defects extending substantially normally to the surface being scanned.

Fig. 13 shows a type of detector of use for still other types of defects, as combinations of deep flaws and surface flaws.

If the material of A is non-magnetic the flaw may be revealed by maintaining a uniform magnetizing field while the detector circuit is in operation. This will result from the variance in eddy-currents and consequent periodic fluctuation of the net external field in the neighborhood of A.

We are, of course, aware that others skilled in the art, particularly after having had the benefit of our disclosure, may devise other similar apparatus for accomplishing the same, and similar, results. We, therefore, do not wish to be limited to the particular structure and circuits shown, nor the precise method disclosed, but wish to be limited only by such prior art as may be pertinent and the claims hereto appended.

We claim as our invention:

1. In a magnetic testing apparatus for detecting flaws in a test piece, in combination, an electromagnetic detector, means for moving the test piece so that the surfaces of the test piece to be investigated are moved adjacent to the detector, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece, said cathode-ray oscilloscope being energized in synchronism with the movement of the test piece to thus also indicate the location of the flaw on the test piece.

2. In a magnetic testing apparatus for detecting flaws in a test piece, in combination, an electromagnetic detector, means for moving the test piece so that the surfaces of the test piece to be investigated are moved adjacent to the detector, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece.

3. In a magnetic testing apparatus for detecting flaws in a test piece, in combination, an electromagnetic detector, means for moving the test piece so that the surfaces of the test piece to be investigated are moved adjacent to the detector, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece and marking means responsive to the current of the pick-up coil adapted to mark the location of the flaw on the test piece.

4. In a magnetic testing apparatus for detecting flaws in a test piece, in combination, an electromagnetic detector which is exclusive of any energizng source of potential, means for subjecting a test piece to a uniform magnetizing effect, means for moving the test piece so that the surfaces of the test piece to be investigated are moved adjacent to the detector, said detector comprising a blade type core of high-permeability and low hysteresis material surrounded by a pick-up coil, and means for indicating the magnitude of the current induced in the pick-up coil.

5. In a magnetic testing apparatus for detecting flaws in a test piece, in combination, an electromagnetic detector, means for subjecting a test piece to a uniform magnetizing effect, means for moving the test piece so that the surfaces of the test piece to be investigated are moved adjacent to the detector, said detector comprising a blade type core of high-permeability and low hysteresis material surrounded by a pick-up coil, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece.

6. In a magnetic testing apparatus for detecting flaws in a test piece, in combination, an electro-magnetic detector, means for subjecting a test piece to a uniform magnetizing effect, means for moving the test piece so that the surfaces of the test piece to be investigated are moved adjacent to the detector, said detector comprising a blade type core of high-permeability and low hysteresis material surrounded by a pick-up coil, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece, said cathode-ray oscilloscope being energized in synchronism with the movement of the test piece to thus also indicate the location of the flaw on the test piece.

7. In a magnetic testing apparatus for detecting flaws in a test piece, in combination, an electro-magnetic detector, means for subjecting a test piece to a uniform magnetizing effect, means for moving the test piece so that the surfaces of the test piece to be investigated are moved adjacent to the detector, said detector comprising a blade type core of high-permeability and low hysteresis material surrounded by a pick-up coil, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece.

8. In a magnetic testing apparatus for detecting flaws in a test piece, in combination, an electro-magnetic detector, means for subjecting a test piece to a uniform magnetizing effect, means for moving the test piece so that the surfaces of the test piece to be investigated are moved adjacent to the detector, said detector comprising a blade type core of high-permeability and low hysteresis material surrounded by a pick-up coil, said detector comprising a narrow blade type core of high permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece, and marking means responsive to the current of the pick-up coil adapted to mark the location of the flaw on the test piece.

9. In a magnetic testing apparatus for detecting flaws in a test piece which has not previously been subjected to any magnetizing current, in combination, means for demagnetizing the test piece, means for subjecting a test piece to a uniform magnetizing effect, said detector comprising a blade type core of high-permeability and low hysteresis material surrounded by a pick-up coil, and means for indicating the magnitude of the current induced in the pick-up coil.

10. In a magnetic testing apparatus for detecting flaws in a test piece, in combination, means for demagnetizing the test piece, means for subjecting a test piece to a uniform magnetizing effect, said detector comprising a blade type core of high-permeability and low hysteresis material surrounded by a pick-up coil, said detector comprising a narrow blade type core of high-permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece.

11. In a magnetic testing apparatus for detecting flaws in a test piece, in combination, means for demagnetizing the test piece, means for subjecting a test piece to a uniform magnetizing effect, said detector comprising a blade type core of high permeability and low hysteresis material surrounded by a pick-up coil, said detector comprising a narrow blade type core of high-permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece, said cathode-ray oscilloscope being energized in synchronism with the movement of the test piece to thus also indicate the location of the flaw on the test piece.

12. In a magnetic testing apparatus for detecting flaws in a test piece, in combination, means for demagnetizing the test piece, means for subjecting a test piece to a uniform magnetizing effect, said detector comprising a blade type core of high permeability and low hysteresis material surrounded by a pick-up coil, said detector comprising a narrow blade type core of high-permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece.

13. In a magnetic testing apparatus for detecting flaws in a test piece, in combination, means for demagnetizing the test piece, means for subjecting a test piece to a uniform magnetizing effect, said detector comprising a blade type core of high permeability and low hysteresis material surrounded by a pick-up coil, said detector comprising a narrow blade type core of high-permeability and low hysteresis material as an iron-nickel alloy known as Hypernik surrounded by a pick-up coil of many turns, and a cathode-ray oscilloscope connected to be responsive to the current in the pick-up coil to thus indicate flaws in the test piece and stroboscopic means also energized by the pick-up coil to indicate the position of the flaw on the test piece and marking means responsive to the current of the pick-up coil adapted to mark the location of the flaw on the test piece.

PORTER H. BRACE.
CLIFTON S. WILLIAMS.